United States Patent
Jones

[15] 3,694,729
[45] Sept. 26, 1972

[54] PORTABLE ELECTRIC POWER APPARATUS

[72] Inventor: Jack D. Jones, Lima, Ohio

[73] Assignee: National Can Retinning Company, Lima, Ohio

[22] Filed: Dec. 28, 1971

[21] Appl. No.: 212,918

[52] U.S. Cl. .......................307/150, 307/9, 307/71, 136/173, 320/2, 320/7, 320/16
[51] Int. Cl. ...............................................H02j 7/00
[58] Field of Search ......307/9, 10 R, 10 BP, 71, 149, 307/150; 136/173; 320/2, 6, 7, 16

[56] References Cited

UNITED STATES PATENTS

| | | | |
|---|---|---|---|
| 1,425,689 | 8/1922 | Powell | 320/2 |
| 1,605,345 | 11/1926 | Hawkins | 320/2 |
| 2,005,623 | 6/1935 | Meyer | 320/2 |
| 2,173,736 | 9/1939 | Thomas | 320/2 |
| 2,375,866 | 5/1945 | Nelms et al. | 320/2 |
| 2,483,673 | 10/1949 | Robinson et al. | 320/2 X |
| 2,808,521 | 10/1957 | Scal | 307/150 |
| 2,978,596 | 4/1961 | Robirds | 320/2 X |
| 3,056,893 | 10/1962 | Russ | 307/150 |
| 3,510,745 | 5/1970 | Futterer | 320/7 |

Primary Examiner—William M. Shoop, Jr.
Attorney—Jerome R. Cox

[57] ABSTRACT

Two portable battery packs are removably mounted on a truck and connected to the truck's electrical system. Each pack contains four 6-volt battery units which are wired to a battery pack connector mounted at the rear of the battery pack housing. Means are provided for connecting the battery units in parallel for charging by the truck generator alternator or battery. When the pack is (1) withdrawn from the truck, and (2) used to power a tool, the battery units are connected in suitable series — parallel — to provide output voltages greater than the charging voltage.

In one embodiment, a charging rack is permanently mounted on and to the truck, the rack having a mating connector which during the charging process engages the battery pack connector. A program connector at other times engages the battery pack connector to provide proper output voltage at the battery pack output connector.

In another embodiment, the charging rack is dispensed with and two double pole double throw switches are used to effect the different series or parallel connections in and to the battery pack.

18 Claims, 14 Drawing Figures

PORTABLE ELECTRIC POWER APPARATUS

BACKGROUND OF THE INVENTION

The invention relates to equipment for supplying electrical power to portable equipment. This invention relates more particularly to a battery pack and its associated charging apparatus which is carried on a service vehicle and conveniently maintains continuous supply of electrical power.

Many construction and repair service men utilize power tools to efficiently perform their services. These power tools are used at remote locations such as construction sites and power and telephone distribution lines. Portable tools require a portable source of power which may be taken by the worker to the site at which the tool is to be used. Portable batteries for operating electrical tools most effectively meet this power need. Such tools include for example, rotary and hammer drills, impact wrenches, chain saws, hack saws, hammers, and lights. Such service men working in the field need this continuous supply of power so that they will not be required to interrupt their work to wait for a battery to charge.

There is, therefore, a need for a portable electric power apparatus which will continuously recharge its battery packs when they are not being used and which can do so without requiring the worker to leave the area in which he is working in order to return the battery packs to a central charging location and without requiring the worker to engage in a substantial amount of electrical connection and switching in order to charge the batteries properly.

The power tools normally available often operate from a 24-volt d-c source. Some, however, operate from a 12-volt source and others from a 6-volt source. A motor vehicle electrical system ordinarily provides a 12-volt system. There is a need therefore, for a portable electrical power apparatus which can be charged by a 12-volt vehicle electrical system and yet, which can provide the worker with a selection of 24, 12, or 6 volts as the output for his power tools. It is further desirable that the worker be able to select the desired output voltage simply and without extensive wiring or switching.

SUMMARY OF THE INVENTION

The portable electric power apparatus of the invention uses a battery pack having a box-like housing for containing several battery units. The housing has a rearwardly facing battery pack connector which is electrically connected to the battery units. The battery pack also has a power outlet for connection to a tool. The battery pack is mountable in a charger rack which is permanently mounted on a motor vehicle. The charger rack has a substantially vertically oriented rear panel and one or more support tracks extending substantially horizontally from the rear panel for slidably receiving battery packs. A forwardly facing charging connector is mounted to the rear panel and is positioned to slidingly engage the battery pack connector as the battery pack is slid along the first support track toward the rear panel. This charging connector is electrically connected to the battery charging circuitry, a portion of which is mounted in the charger rack.

The battery pack electrical connector has a pair of contacts for each battery unit. Each pole of each battery unit is connected to a different one of these contacts. The charging connector, which is matingly engageable at times with the battery pack connector has its electrical terminals conductively connected to a source of input, d-c charging power. When the charging connector is engaged with the battery pack connector, the positive poles of the battery units are connected to the positive poles of said source of charging power and the negative poles of the battery units are connected to the negative poles of said source. A program connector is alternatively matingly engageable at times to the battery pack connector and has its terminals interconnected for suitable interconnecting the poles of the battery units to permit selection of the output voltage and consumption of power by the power tool when the program connector is engaged in the battery pack connector.

It is therefore an object of the invention to provide an improved portable electric power apparatus.

Another object of the invention is to provide a portable electric power apparatus which makes a substantially continuous supply of power available to a worker in the field.

Another object of the invention is to provide a portable battery pack and associated charging rack which enable the work to sumultaneously store and charge the battery packs with maximum simplicity and the least thought and effort.

Further objects and features of the invention will be apparent from the following specification and claims when considered in connection with the accompanying drawings illustrating the embodiments of the invention.

In describing the preferred embodiments of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the terms "connected" or "conductively connected" are not restricted to direct electrical connection. Such connections may be made through additional electrical elements where such connection is functionally equivalent.

DETAILED DESCRIPTION

FIGS. 1 through 3 and FIG. 5 illustrate a portable battery pack 10 and its associated charging rack 12. The battery pack 10 has a box-like housing 14 with a carrying handle 15 attached to its top face.

The battery pack contains several battery units and its internal contents are described below. A recessed, rearwardly facing battery pack connector 18, visible in FIG. 2B, is mounted to a rear wall 19 of the housing 14. The battery pack connector 18 is a female connector having eight terminal contacts. A Tee receptacle 20 is mounted to the front side 21 of the battery pack 10 for receiving a male plug from the power cord of any tool it may be desired to supply with power.

The charger rack 12 is normally, though not necessarily, permanently mounted to a motor vehicle which is not shown. The charger rack 12 has a suitable support frame 22 to which a substantially vertically oriented rear panel 24 is attached. A first battery pack support cradle 30 is constructed on the lower portion of the charger rack 12 to slidably receive the battery pack 10 and retain it in a stored position. The support cradle 30 is a track extending substantially horizontally forward from the rear panel 24. The track comprises four parallel right angle, structural beams 32, 34, 36, and 38 for slidably and closely receiving in their acute angles four parallel side edges of the battery pack housing 14. These four structural beams retain the battery pack housing against vertical and lateral movement.

A forwardly facing, charging connector 40 is mounted to the rear panel 24 centrally of the lower battery pack cradle 30. The charging connector 40 is a male connector positioned to slidingly engage the battery pack connector 18 as the battery pack 10 is slid into the first cradle 30 toward the rear panel 24. The charging connector 40 is connected to the battery charging circuitry, described below, which is mounted in the charger rack 12. A second battery pack cradle 42 is constructed at the upper portion of the charger rack 12. The upper battery pack cradle 42 is substantially identical to the lower cradle and has four parallel structural beams 44, 46, 48 and 51 for receiving a second battery pack which is not illustrated but which is identical to the battery pack 10. The upper battery pack cradle 42 is also provided with a charging connector 50 which is mounted to the rear panel 24 and is substantially similar to the lower charging connector 40. Intermediate, the lower battery pack cradle 30 and the upper battery pack cradle 42 is the charging circuitry of the charging rack which lies behind a control panel 52. The control panel 52 has a pair of ammeters 54 and 56 for monitoring the charging current to the battery packs in the upper and lower battery pack cradles 42 and 30.

Male program connectors 58 (which numeral is used to designate collectively connectors 58a, 58b and 58c) and 60, (which numeral is also used collectively to designate connectors identical with 58a, 58b and 58c) are all described in detail below and are received in mating female control panel connectors which are mounted on the control panel 52. A switch 62 is provided to turn the charging circuitry on and off. A main pilot lamp 64 is illuminated when the charging circuitry is turned on. A first charging pilot light 66 is illuminated when the program connector 60 is properly inserted in its control panel connector. A similar second pilot light 68 is illuminated when the other program connector 58 is properly inserted in its control panel connector. The male program connectors 58 and 60 have prongs which are identical with the prongs of the charging connectors 40 and 50, so that they may, as described below, at times, be matingly engaged in the battery pack connector, such as the battery pack connector 18 illustrated in FIG. 2B.

Figure 6:
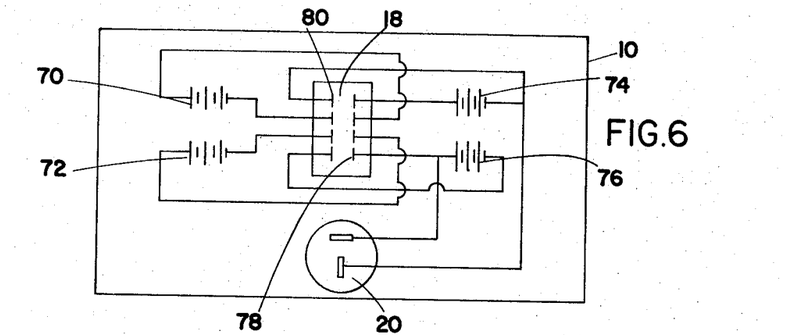
FIG. 6 is a schematic diagram of a battery pack embodying the invention.

The electrical circuitry of the battery pack 10 is illustrated in FIG. 6. The battery pack 10 has four, preferably 6-volt, battery units 70, 72, 74 and 76. Each battery unit preferably, is a 6-volt, multi-cell battery, such as is commercially available. However, the battery units may be suitable groupings of cells tied together to function equivalently as a single battery unit. The battery pack connector 18 has a pair of contacts for each battery unit so that the preferred connector has eight contacts. Each pole of each battery unit is connected to a different one of the contacts. For simplicity, the positive poles in FIG. 6 are connected to the four right hand contacts. The negative poles are connected to the four left hand contacts. Thus, each connector contact of the battery pack connector 18 represents a connection to a single pole of a single battery unit. In addition, the contact 78, which is connected to the positive pole of the battery unit 76, is also connected to the Tee receptacle 20. The contact 80 is connected to the other contact of the Tee receptacle 20 and as well as to the negative pole of the battery unit 74. Thus, the output power terminals, which are available for connection through receptacle 20 to a power consuming tool, are conductively connected to a positive pole of one of the battery units and to the negative pole of another battery unit. However, without any connections between the terminal contacts of the battery pack connector 18, no current could flow into a tool connected to the Tee receptacle 20. The program connectors provide the needed connections.

Figure 8:
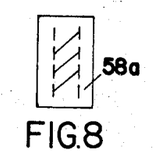
FIG. 8, FIG. 9, and FIG. 10 are schematic diagrams of program plugs embodying the invention.
Figure 9:
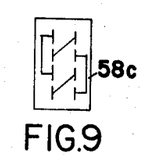
Figure 10:
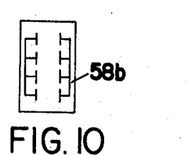

FIGS. 8, 9, and 10 indicate alternative program connectors which are matingly engageable at times to the battery pack connector 18. The terminals of the program connectors are conductively interconnected for suitably interconnecting the poles of the battery units for selecting the output voltage at the receptacle 20 and to permit consumption of power by a power tool when the program connector is engaged in the battery pack connector 18.

Thus, for example, if the program connector 58a of FIG. 8 is matingly engaged in the battery pack connector 18, then the battery units 74, 70, 72, and 76 are series connected to the terminals of the Tee receptacle 20. The program connector of FIG. 8 would connect the positive pole of the battery 74 to the negative pole of the battery 70. Similarly, it would also connect the positive pole of the battery 70 to the negative pole of the battery 72 and the positive pole of the battery 72 to the negative pole of the battery 76. The positive pole of the battery 76 and the negative pole of the battery 74 are permanently connected to the respective contacts of the Tee receptacle 20. With four 6-volt battery units, the use of the program connector of FIG. 8 thus provides a 24-volt power supply at the Tee receptacle 20.

If the program connector 58b illustrated in FIG. 10 is matingly engaged in the battery pack connector 18, then the four battery units 70, 72, 74 and 76 are parallel connected to provide a 6-volt power supply at the Tee receptacle 20.

Finally, if the program connector 58c illustrated in FIG. 9 is matingly engaged in the battery pack connector 18, then the battery units 72 and 74 are parallel connected to each other, the battery units 70 and 76 are parallel connected to each other and the parallel connected pairs are series connected to each other to provide an output voltage of 12 volts at the Tee receptacle 20. Looking at it from another viewpoint, 70 and 74 are series connected, and 72 and 76 are series connected, and the two series are arranged in parallel. This provides a 12-volt supply at Tee receptacle 20.

Figure 1:
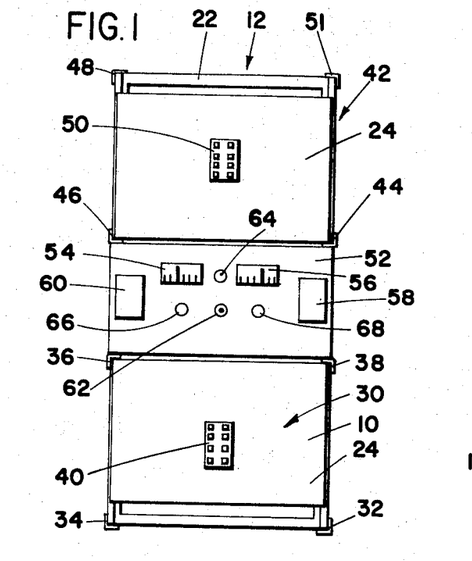
FIG. 1 is a view in front elevation of a charger rack embodying the invention.
Figure 2:
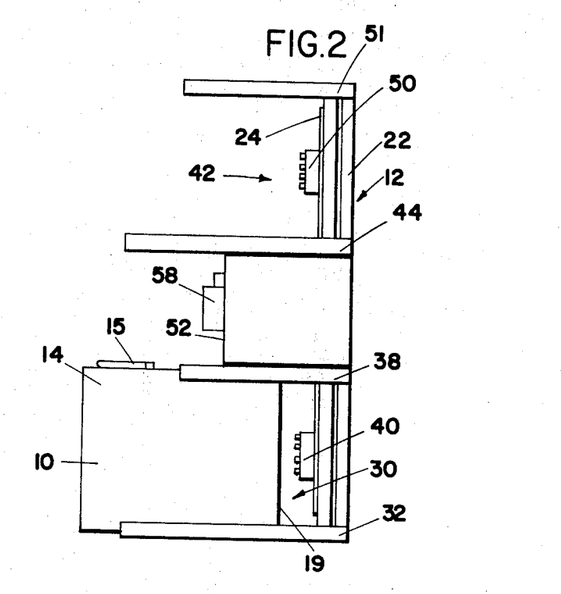
FIG. 2 is a view in side elevation of the charger rack of FIG. 1 with a portable battery pack partially slid into the lower storage position on the charger rack.
Figure 2A:
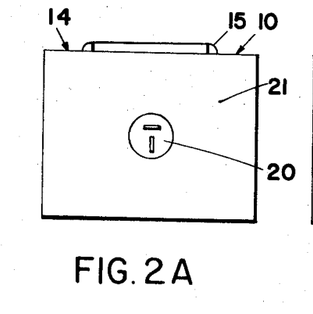
FIG. 2A is a view in front elevation of the battery pack illustrated in FIG. 2.
Figure 2B:
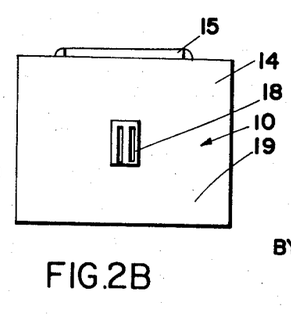
FIG. 2B is a view in rear elevation of the battery pack illustrated in FIG. 2.
Figure 3:
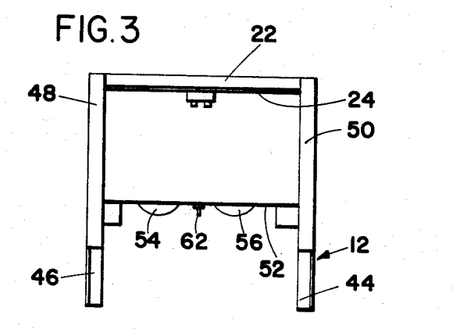
FIG. 3 is a plan view of the embodiment illustrated in FIG. 1.

Thus, a person using the portable battery pack 10 merely withdraws the battery pack from the charger rack 12 illustrated in FIGS. 1-3 and inserts the appropriate program connector in the battery pack connector at the rear of the battery pack. In doing so, he selects the desired output voltage.

Figure 7:
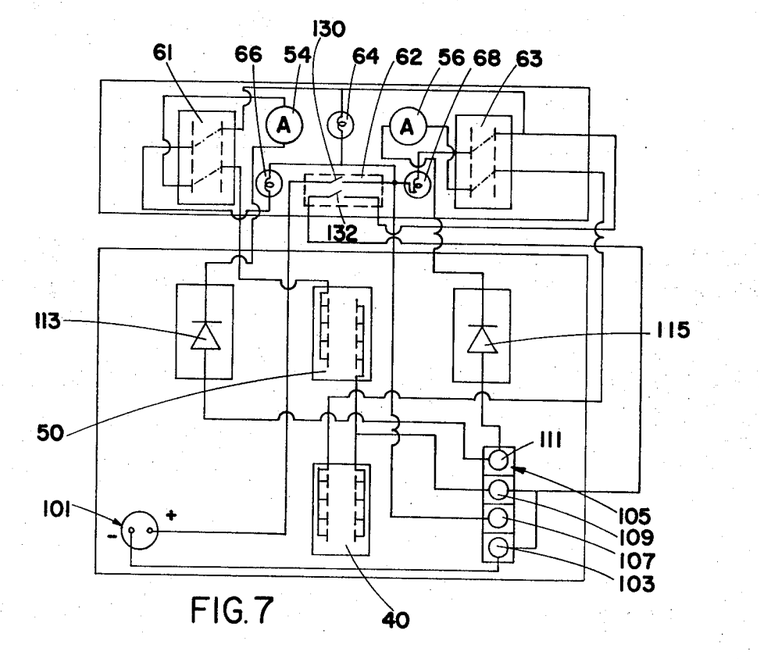
FIG. 7 is a schematic diagram of the charging circuitry which is incorporated in the charger rack illustrated in FIG. 1.

FIG. 7 illustrates the charging circuitry which is used to charge the battery pack 10 and the similar battery pack which is mountable in the cradle 42 at the upper portion of the charger rack 12. A workman, when replacing a portable battery pack in the charger rack, must first remove the program connector 58a, 58b, or 58c from the rear of the battery pack so that the battery pack connector can matingly engage with the charging connector when the battery is slid into its cradle on the charger rack. To assure that the workman removes the program connector and to assure that the program connector is not mislaid, I have provided a control panel connector 61 which is connected to the upper cradle and a control panel connector 63 which is connected to the lower cradle 30 to receive the program connectors when they are not mounted to the battery packs. Additionally, circuitry is provided to prevent the charging of the battery and the illumination of the appropriate pilot lights until the workman has properly positioned the program connector in the appropriate control panel connector. Thus, after the battery pack 10 is slid in the lower cradle 30 into engagement with the charging connector 40, the program connector 58 (either 58a or 58c) must be inserted in the control panel connector 63 before the lower battery pack will begin charging from charging connector 40. Similarly, a program connector must be inserted in the control panel connector 61 before the upper battery pack can begin receiving charge from the charging connector 50. To simplify explanation of the charging circuitry, I assume that the operator has inserted the program connectors properly in the control panel connectors and the connection made by these connectors is therefore illustrated in phantom or in dotted lines on the control panel connectors 61 and 63.

The vehicle generator or alternator is connected to power input terminals 101, the negative terminal of which is connected to a ground terminal 103 on a terminal board 105. The main on-off switch 62, accessible at the control panel 52, is a double-pole, single throw switch which, when turned on, connects the positive terminal from the input power terminal 101 to the input terminal 107 of the terminal board 105. The terminals 103 and 107 on the terminal board 105 are also connected to the input of a current limiting charger module the function of which is to reduce the charging current as the batteries are suitably charged. However, such a module is known in the art and is not necessary to the invention, and therefore the internal circuitry is not illustrated. However, in an equivalent manner, although sacrificing the power saving feature afforded by the current limiting module, the terminals 103 and 107 can both be directly connected to the terminals 109 and 111 respectively. As illustrated, however, terminals 109 and 111 are the output terminals of the current limiting charger module.

The right hand terminal contacts of the charging connectors 40 and 50 are interconnected together and connected to the ground output terminal 109. This effectively connects the negative ground pole of the source of input d-c charging power to the negative poles of all of the battery units in the battery packs whenever the charging connectors are conductively engaged in the battery pack connectors. It must be noted that FIG. 6 is looking at the circuit from the opposite direction to FIG. 7 so that the left hand contacts of FIG. 6 engage with the right hand contacts of FIG. 7. The positive output terminal 111 is the positive pole of the source of d-c input charging power and is connected through a series connected diode 113 and the ammeter 54 and through the program plug 58 (58a or 58c) inserted in the panel connector 61 to the left hand contacts of the upper charging connector 50. The diode 113 is connected in a polarity to permit charging current to flow but to prevent discharge of the battery, especially in a situation where an alternator is used. The diode is provided with a suitable heat sink. This effectively connects the positive pole of the source of input, d-c, charging power to the positive poles of all the battery units which are in the battery pack stored in the upper cradle 42. Similarly, the positive output terminal 111 is connected through a similar diode 115 into the ammeter 56 and the program connector 58 (58a or 58c) inserted in the control panel connector 63 to the left hand terminals of the lower charging connector 40. This effectively connects the positive pole of the source of input, d-c, charging power to the positive poles of all the battery units in the battery pack which is stored in the lower cradle 30 of the charging rack 12.

The lower contacts 132 of the switch 62 connect the negative pole of the input charging supply at the terminal 109 to one side of the main pilot lamp 64. The opposite side of the main pilot lamp 64 is connected to the positive pole of the source of input power at terminals 101 by the upper contacts 130 of the switch 62. Thus, whenever the switch 62 is closed, the main pilot lamp 64 is illuminated. Additionally, the contacts 130 of the switch 62 also connect the positive pole of the input source at the terminals 101 to one side of each of the charging pilot lamps 66 and 68. The opposite side of the charging pilot lamp 66 is connected through the control panel connector 61 and the engaged program plug 58 and through the closed contacts 132 to the negative ground terminal 109. Therefore, if the main switch 62 is closed, and if a program plug is inserted in the connector 61, the charging pilot light 66 will be illuminated. Similarly, the opposite side of charging pilot light 68 is connnected through the control panel connector 63 and through an engaged program plug and through the closed contacts 132 of the switch 62 to the ground terminal 109. The charging pilot lamp 68 is similarly illuminated whenever the switch 62 is closed and a program plug is engaged in the control panel connector 63.

Figure 4:
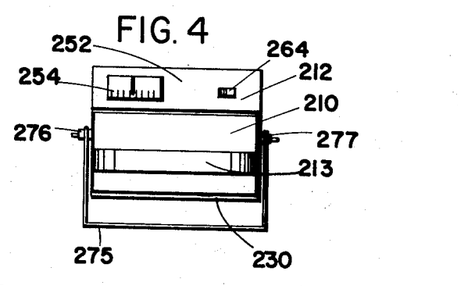
FIG. 4 is a view in front elevation of an alternative embodiment of the invention.
Figure 5:
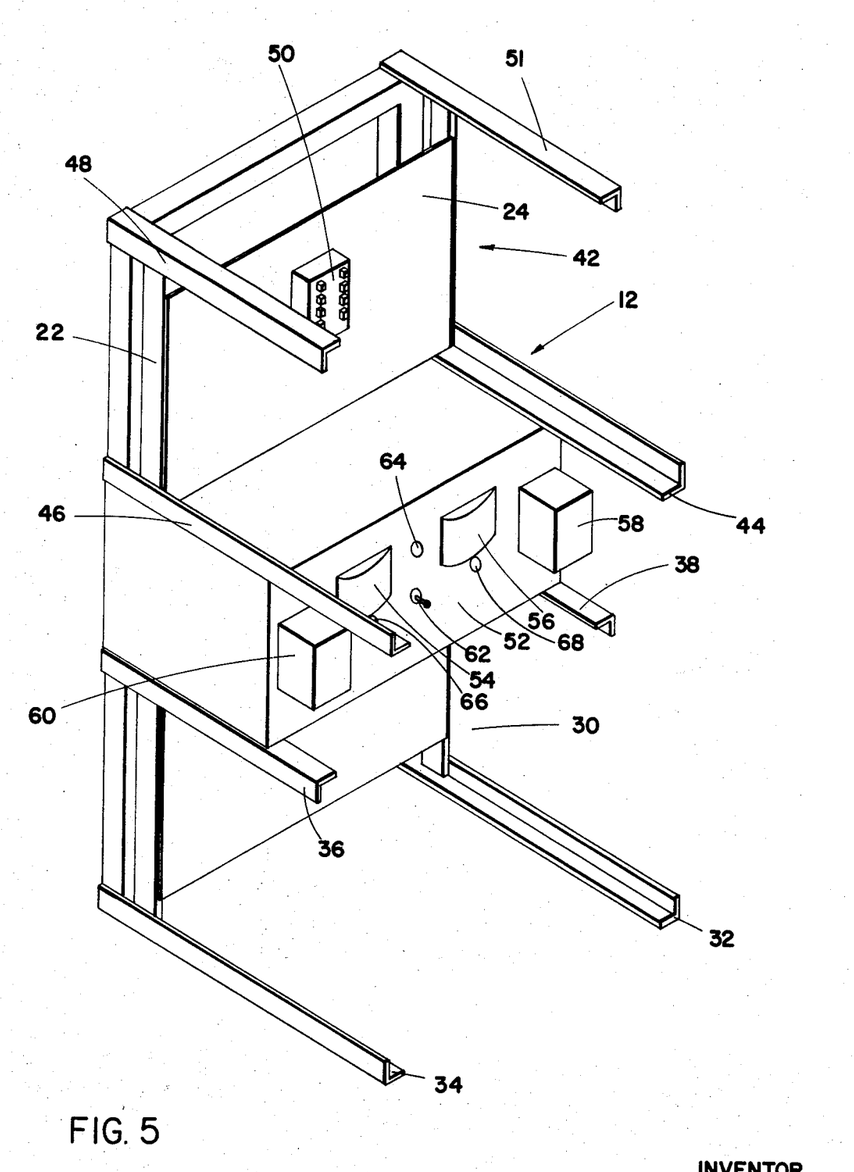
FIG. 5 is a view in perspective of the charging rack illustrated in FIG. 1.

FIG. 4 illustrates an alternative embodiment of the invention comprising a rack 212 for receiving and charging a single battery pack 210. The battery pack 210 has a hand carrying strap 213 mounted on its forwardly directed face. The charger rack 212 has a control panel 252 with an ammeter 254 and a main switch 264. The charger rack 212 has a box-like opening 230 for slidably receiving the battery pack 210. A mounting yoke 275 is bolted at its opposite ends by bolts 276 and 277 to the charging rack 212.

The internal circuitry of the embodiment of FIG. 4 utilizes half the circuitry illustrated in FIG. 7. In addition, in the embodiment illustrated in FIG. 4, the charger module whose terminals are indicated at the terminal board 105 illustrated in FIG. 7 and the pilot lights have been eliminated from the circuitry.

In order to avoid excessive drain on the vehicle battery due to very substantially discharged battery packs, an automatically controlled single pole double throw switch may be employed. Such a switch can be controlled by an electrical timer to alternately apply the alternator or generator output to the vehicle battery and to the charging rack. For example, the entire alternator output can be applied to charge the portable battery packs for 5 minutes. Then the timer would switch to apply the alternator output to the vehicle battery. In this way, vehicle operation is unaffected but the charger rack circuitry is never connected parallel to the vehicle battery.

Figure 11:
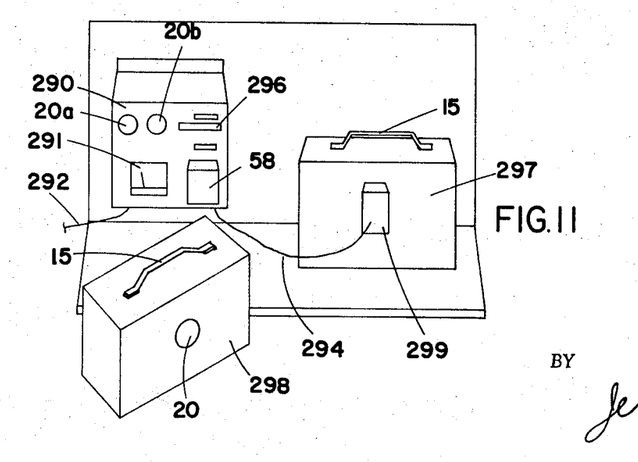
FIG. 11 is a view in perspective of another embodiment of my invention using a different electrical circuit and employing a gang switch for converting the system to and from a condition in which the battery pack cooperates with the vehicle battery, alternator or generator to supply output power for connection to a power consuming tool from and to a condition in which a source of input d-c charging power supplies electrical current for recharging the battery pack.

In FIG. 11 is shown a perspective view showing respectively a charging box 290 having on its face a plug 58 which is for convenience inserted in a dummy socket, a pair of T receptacles 20a and 20b, and an ammeter 291. Connected to the box 290 is a power input electrical cable 292 and also a battery charging electrical cable 294. A switch 293 (see FIG. 12) is provided having a handle 296 shown on the front of box 290. Associated with the box 290 are a pair of batteries designated respectively 297 and 298. In the rear of the battery 298 is an outlet plug or T receptacle 20 for connection to or for receiving a male plug from a power cord of any tool it may be desired to supply with power. In the front of battery 297 there is shown a male plug battery pack connector 299 which is adapted to fit into a female plug receptacle of battery 297 or of battery 298.

Figure 12:
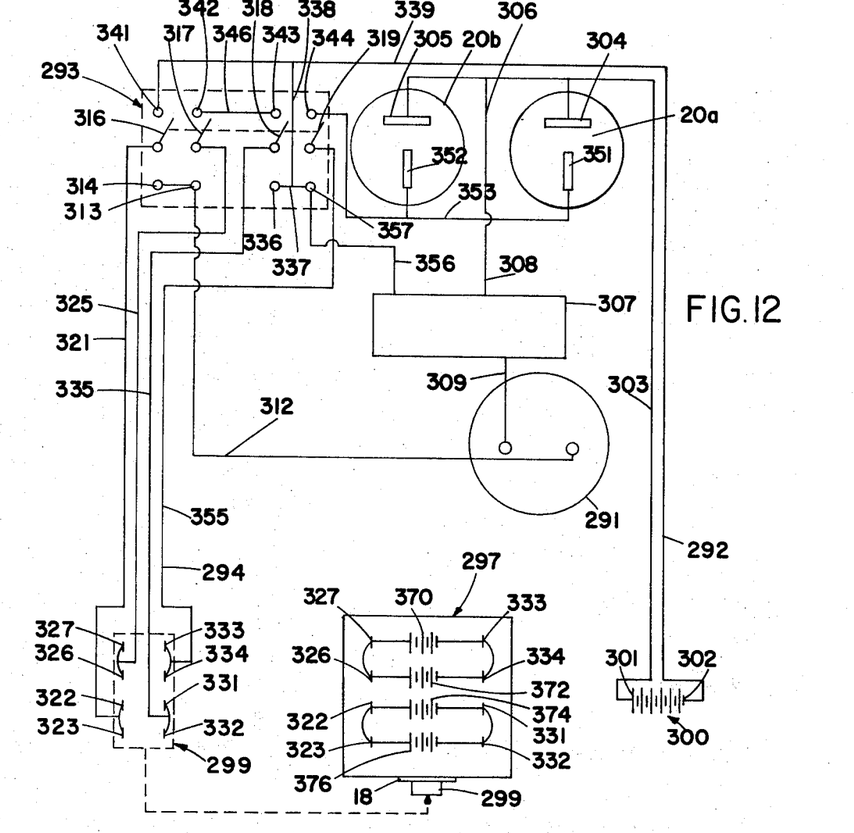
FIG. 12 is a schematic diagram showing the electrical connections of the embodiment of my invention illustrated in FIG. 11.

In the system as illustrated in FIGS. 11 and 12, the numeral 300 represents a vehicle battery to which an alternator or a generator of the vehicle is connected for keeping the battery charged preferably to slightly above a 12-volt capacity. The battery 300 has a positive terminal 301 and a negative terminal 302. Lead 303 from the positive terminal is connected to positive terminals 304 and 305 of T receptacles 20a and 20b respectively. It is also connected through a branch lead 306 to a charger regulator 307 as at 308. The positive conventional current supplied at 308 may at times pass through a lead 309 to a 10 ampere ammeter 291 to show the charging rate. After passing through ammeter 291, current may flow at times through lead 312 to switch contacts 313 and 314. These contacts are part of a double throw gang switch 293 having movable blades 316, 317, 318 and 319. When the blades are in the position shown, no current can flow through 306, 309 or 312. However, if the switch 293 is moved downward, the blades 316, 317, 318 and 319 are also moved downward to make contacts with appropriate switch contacts. Thus, blades 316 and 317 make contacts with contacts 314 and 313 respectively. Thereupon, positive conventional current flows from 303 through leads 306, 309, 312 and (utilizing switch blade 316) 321 to positive terminals 322 and 323 of male plug 299 heretofore designated pack connector 299. Current also flows from 303 through leads 306, 309, 312 and (utilizing switch blade 317) 325 to positive terminals 326 and 327 of male plug 299. Referring to the battery 297 indicated in the lower central part of FIG. 12, it may be noted that the contacts 331–334 inclusive and 322, 323, 326 and 327 are duplicates of the same contacts shown in the male plug 299 to the left. This duplication is made so that hopefully the electrical connection of the contacts to the respective battery units 370, 372, 374, and 376, when the male plug 299 is inserted in the female socket 18, may be more easily shown. The male plug 299 is duplicated in the two parts of the Figure for the same reason. Assuming the male plug 299 is inserted in the female receptacle 18 of the battery pack 297, current passes through the battery pack in parallel through the four 6-volt battery units 370, 372, 374 and 376 of battery 297 and then back to the plug 299 and the negative contacts 331, 332, 333 and 334. Contacts 331 and 332 are connected through lead 335, switch blade 318, contact 336, leads 337, 338 and 339 to negative battery terminal 302. Contacts 333 and 334 are connected through lead 355, switch blade 319, contact 357, leads 337, 338 and 339 to negative battery terminal 302. Thus, the battery pack 297 is recharged from vehicle battery 300 or from the alternator or generator of the vehicle, one of which is effectively connected to the terminals of the battery 300.

Now, assuming it is desired to supply 24-volt power to receptacles 20a and 20b, the switch 293 is moved to its upper position thus causing switch blades 316, 317, 318 and 319 to make contacts with switch contacts 341, 342, 343 and 344 respectively. Thereupon, positive conventional current may flow from battery pack 297 through positive terminals 322, 323, 326 and 327 as follows. Again, for example, from units 370 and 372 through positive contacts 326 and 327, lead 325, switch blade 317, contact 342, lead 346, contact 343, switch blade 318, lead 335, negative contacts 331 and 332 of male plug 299 to battery units 374 and 376 of battery pack 297, and then to positive contacts 322 and 323, lead 321, switch blade 316, contact 341 and lead 339 to negative terminal 302 of battery 300. The two battery units 370 and 372 acting in parallel are placed in series with battery units 374 and 376, thus supplying 12-volt power to battery 300. The 12-volt power from battery pack 297 passing through the battery 300 is placed in series with the 12-volt voltage of battery 300 thus supplying 24-volt voltage to slots 304 and 305 of T receptacles 20a and 20b. Negative slots 351 and 352 of T receptacles 20a and 20b are connected through lead 353, switch contact 344, switch blade 319, lead 355, negative contacts 333 and 334 of male plug 299 and to negative terminals of battery units 370 and 372 thus completing the series circuit through vehicle battery 300 and battery pack 297.

The integrated circuit charger regulator 307 prevents a greater voltage than 7.2 volts from flowing from 12-volt battery 300 (or the alternator or generator) to battery pack 297 in recharging it. The charger regulator 307 is connected through lead 356, switch contact 357, leads 337, 338 and 339 back to car battery negative terminal 302.

In operation, the battery packs are normally stored in the charging rack 12 with the battery pack connectors, such as the connector 40. With the main switch 62 closed, charging current can flow to charge the battery units in the respective battery packs. Whenever the service vehicle engine is running, the batteries are being suitably charged. For example, as a service man drives from one location to another, his portable battery packs are being simultaneously recharged so that whenever he arrives at the job, the battery packs are ready for operation.

When the service man arrives at his job site, he simply grasps one of the battery packs by the handle, slides it toward him and removes it from the charging rack. He then reaches on the control panel and removes the program plug from the control panel and inserts it at the rear of the battery pack in the battery pack connector. He may have available to him program plugs of the types illustrated in FIG. 8 (58a), FIG. 9 (58c) and FIG. 10 (58b). The plug of the power tool is inserted in the appropriate receptacle in the battery pack such as the receptacle 20 and the tool is now ready for use. The tool and the battery pack may be easily hand carried to the site of the work to be preformed.

If a job is completed, the reverse sequence of events occurs. The tool is unplugged from the battery pack, the program plug is removed from the rear of the battery pack and inserted in the control panel connector on the charging rack. The battery pack is then slid along the tracks of its cradle into its stored charging position on the charging rack. As the serviceman drives away, the battery pack is appropriately charged.

In the alternative, if the serviceman drains substantial power from the battery pack while working on the job, he may return the drained battery pack to the charging rack as described above. He then can immediately remove the second battery pack from the charging rack with similar steps to immediately have available an alternative supply of electrical power. The serviceman continues to use the tools without interruption and at the same time, whether the service vehicle's motor is running or not, the first battery will be suitably recharged. This can occur because the previously mentioned, but not shown, current limiting charger module also limits the maximum charging voltage to 7.2 volts while receiving an input voltage sufficiently high for its proper operation from the 12-volt vehicle battery even when the engine is not running. Thus, by alternately using the two battery packs, a continuous supply of electrical power is always available.

It is to be understood that while the detailed drawings and specific examples given describe preferred embodiments of the invention, they are for the purpose of illustration only, that the apparatus of the invention is not limited to the precise details and conditions disclosed, and that various changes may be made therein without departing from the spirit of the invention which is defined by the following claims.

I claim:
1. An electric power apparatus comprising:
   a. a portable battery pack comprising:
      1. a plurality of battery units mounted in said pack, each battery unit having a positive and a negative pole;
      2. a battery pack electrical connector having a pair of contacts for each battery unit and having each pole of each battery unit connected to a different one of said contacts;
      3. a pair of output power terminals for connection to a power consuming tool; and
      4. means for conductively connecting one output terminal to a positive pole of one battery unit and the other output terminal to the negative pole of another battery unit; and
   b. a cooperating battery charging apparatus comprising:
      1. a source of input d-c charging power having a positive pole and a negative pole;
      2. means for at times conductively connecting the positive poles of said battery units to the positive pole of said source and for conductively connecting the negative poles of said battery units to the negative pole of said source;
      whereby when said source is so connected the battery units are connected to said source in parallel and the batteries are charged in parallel; and
   c. means for at times conductively interconnecting the poles of said battery units to select the output voltage to said output power terminals to provide for selected consumption of power by said power tool.

2. An apparatus according to claim 1,
wherein the means for at times conductively interconnecting the poles of the battery units at times interconnect the poles of at least two of the battery units in series to at least double the output voltage of said battery pack above the output voltage of any individual battery unit;
whereby the portable electric power apparatus is charged in a parallel circuit and provides output for power consuming tools by a series circuit.

3. An apparatus according to claim 1, wherein the means for at times conductively connecting the positive poles of said battery units to the positive pole of said source and for conductively connecting the negative poles of said battery units to the negative pole of said source comprises a charging electrical connector matingly engageable at times with said battery pack electrical connector and having its electrical terminals conductively connected to said source of power; and
wherein the means for at times conductively interconnecting the poles of said battery units to select the output voltage to said outlet power terminals comprises a program connector matingly engageable at times to said battery pack connector and having its terminals conductively interconnected for suitably interconnecting the poles of said battery units to permit selection of the output voltage and consumption of power by said power tool when said program connector is engaged in said battery pack connector.

4. An electric power apparatus comprising:
a. a portable battery pack comprising
1. a plurality of battery units mounted in said pack, each battery unit having a positive and a negative pole;
2. a battery pack electrical connector having a pair of contacts for each battery unit and having each pole of each battery unit connected to a different one of said contacts; and
3. a pair of output power terminals for connection to a power consuming tool; one output terminal conductively connected to a positive pole of one battery unit and the other output terminal conductively connected to the negative pole of another battery unit; and
b. a cooperating battery charging apparatus comprising
1. a source of input d-c charging power having a positive pole and a negative pole;
2. a charging electrical connector matingly engageable at times with said battery pack connector and having its electrical terminals conductively connected to said source of power for conductively connecting the positive poles of said battery units to the positive pole of said source and for conductively connecting the negative poles of said battery units to the negative pole of said source whenever said charging connector is conductively engaged to said battery pack connector; and
c. a program connector matingly engageable at times to said battery pack connector and having its terminals conductively interconnected for suitably interconnecting the poles of said battery units to permit selection of the output voltage and consumption of power by said power tool when said program connector is engaged in said battery pack connector.

5. An apparatus according to claim 4,
wherein said battery units are parallel connected to said source of charging power by said charging connector when the charging connector is engaged in the battery pack connector and wherein the battery units are series connected to said output terminals by said program connector when the program connector is engaged in the battery pack connector.

6. An apparatus according to claim 5,
wherein said battery pack has four, 6 volt battery units and wherein there are two alternative program connectors matingly engageable to said battery pack connector, a first alternative program connector for connecting all the battery units in parallel to said output terminals and the second alternative program connector for connecting the battery units in two series connected pairs and for connecting these pairs in parallel to each other.

7. An apparatus according to claim 4,
wherein a control panel connector, matingly engageable to said program connector, has a pair of first terminals serially interposed between a pole of said source of charging power and said charging connector, said first terminals opening the circuit when not interconnected and said terminals being connected together to close said charging circuit by said program connector when said program connector is engaged to said control panel connector.

8. An apparatus according to claim 7,
wherein a series connected ammeter and diode, connected in a polarity to permit charging current flow, are serially interposed between said source of charging power and said charging connector.

9. An apparatus according to claim 7,
wherein said control panel connector has a pair of second terminals serially connected between said source of power and an indicator lamp and wherein said second terminals are connected together by said program connector when said program connector is engaged in said panel connector and said lamp is illuminated to indicate engagement of the program connector to the panel connector.

10. An apparatus according to claim 7,
wherein said battery units are parallel connected to said source of charging power by said charger connector when the charger connector is engaged in the battery pack connector and wherein the battery units are series connected to said output terminals by said program connector when the program connector is engaged in the battery pack connector.

11. An apparatus according to claim 10,
wherein said apparatus includes a second battery pack similar to said first battery pack, a second cooperating charging connector similar to said first charging connector, a second program connector similar to said first program connector, and a second control panel connector similar to said first panel connector, to permit alternate charging of one battery pack during consumption of power from the other battery pack wherein a substantially continuous supply of power is available.

12. An apparatus according to claim 10,
wherein a control panel connector, matingly engageable to said program connector, has a pair of first terminals serially interposed between a pole of said source of charging power and said charging connector, said first terminals opening the charging circuit when not interconnected and said terminals being connected together to close said charging circuit by said program connector when said program connector is engaged to said control panel connector, wherein a series connected ammeter and diode, connected in a polarity to permit charging current flow, are serially interposed between said source of charging connector.

13. An apparatus according to claim 1,
wherein secondary outlet power terminals are mounted to said charging apparatus, the means for at times conductively connecting the positive poles of said battery units to the positive pole of said source and for conductively connecting the negative poles of said battery units to the negative pole of said source and the means for at times conductively interconnecting the poles of said battery units to select the output voltage to said outlet power terminals comprises a double throw gang switch having a plurality of movable blades and having a plurality of fixed contacts for each of said movable blades.

14. A portable electric power apparatus comprising
a. a battery pack comprising a box-like housing for containing battery units and having a rearwardly facing battery pack connector mounted to a rear wall of said housing, said connector being electrically connected to said battery units, said battery pack also having power outlet terminals for connection to a tool; and
b. a charger rack apparatus mountable to a motor vehicle, said rack comprising:
  1. a substantially vertically oriented rear panel;
  2. a first support cradle comprising a track extending substantially horizontally from said rear panel for slidably receiving said battery pack;
  3. a forwardly facing charging connector mounted to said rear panel and positioned to slidingly engage said battery pack connector as said battery pack is slid into said first cradle toward said rear panel, said charging connector being electrically connected to battery charging circuitry which is connected to said charger rack.

15. An apparatus according to claim 14,
wherein said track comprises four, parallel, right angle structural beams for slidably receiving in their acute angles four side edges of said housing and for retaining said housing against vertical and lateral movement.

16. An apparatus according to claim 14,
wherein a second similar battery pack is provided;
wherein the charger rack further comprises a second support cradle vertically above said first support cradle and comprising a second track extending substantially horizontally from said rear panel for slidably receiving said second battery pack; and
wherein a second, forwardly facing charging connector is mounted to said rear panel and positioned to slidably engage a second battery pack connector of said second battery pack as said second battery pack is slid along said second track toward said rear panel, said second charging connector also being connected to said battery charging circuitry.

17. An apparatus according to claim 16,
wherein each of said tracks comprises four, parallel, right right angle structural beams for slidably receiving in their acute angles, four side edges of said housing and for retaining said housing against vertical and lateral movement.

18. An apparatus according to claim 16,
wherein said charging circuitry has a control panel which is mounted intermediate said tracks.

* * * * *